March 29, 1960  E. WILDHABER  2,930,256
DIFFERENTIAL
Filed May 31, 1957  3 Sheets-Sheet 1
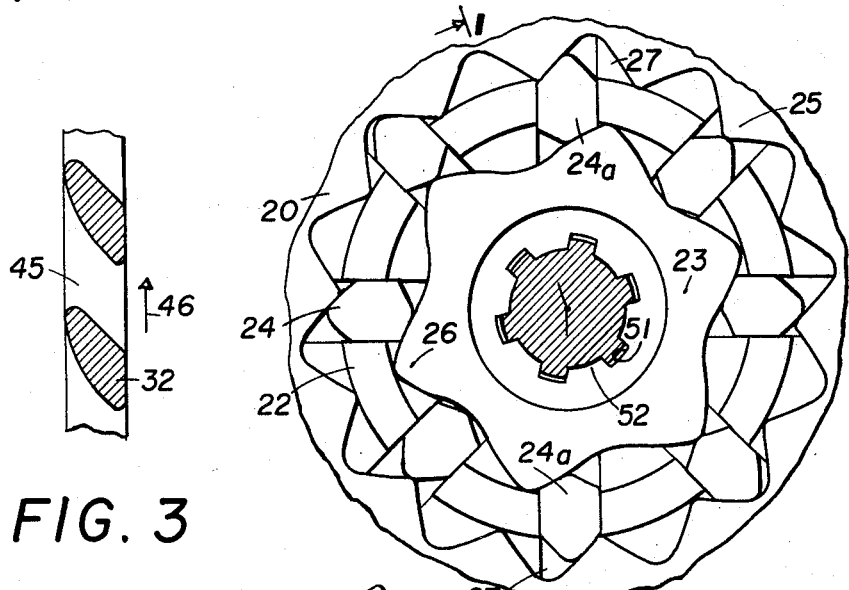
FIG. 3
FIG. 2
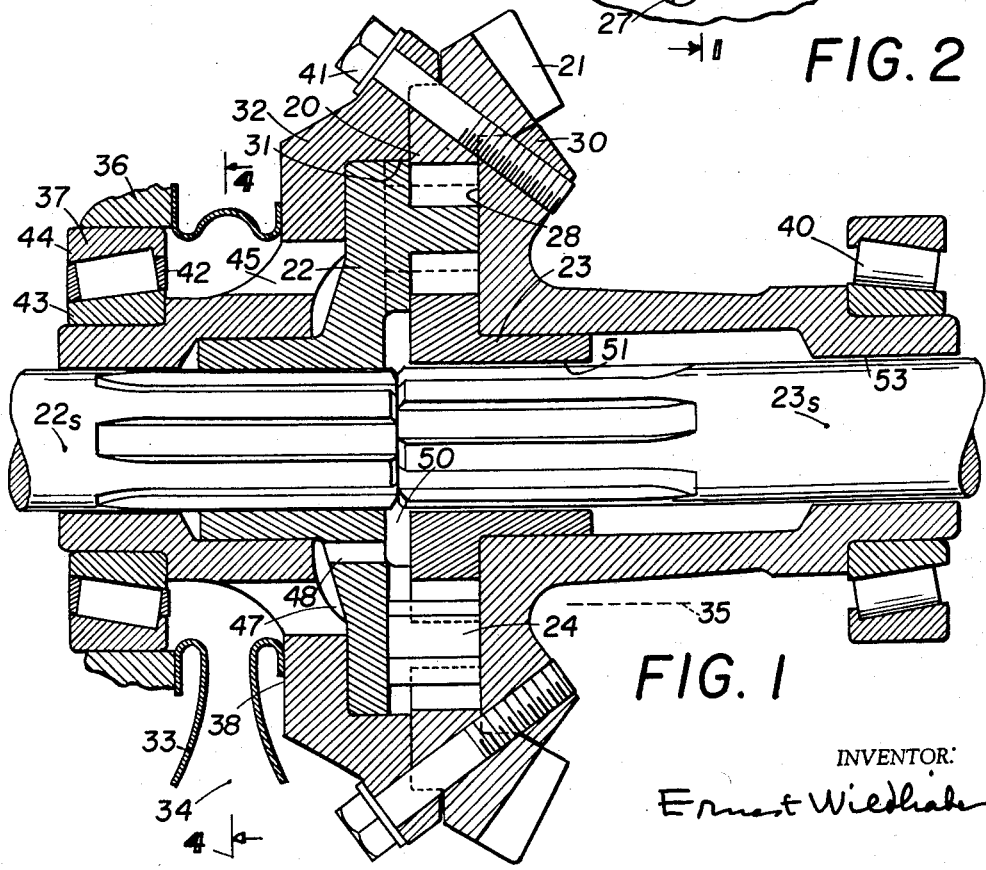
FIG. 1
INVENTOR:
Ernest Wildhaber March 29, 1960 E. WILDHABER 2,930,256
DIFFERENTIAL
Filed May 31, 1957 3 Sheets-Sheet 2
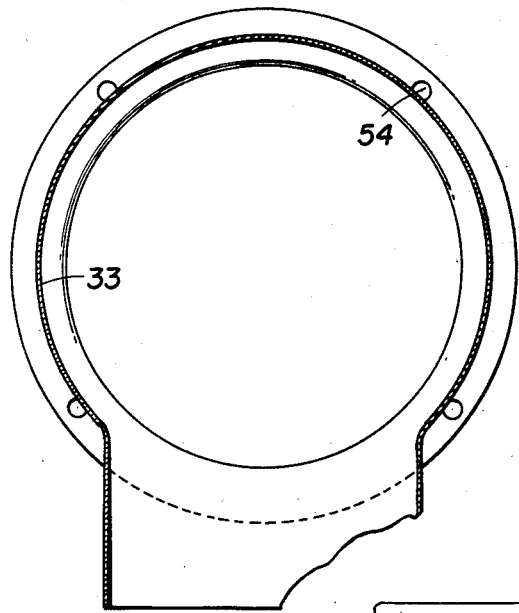
FIG. 4
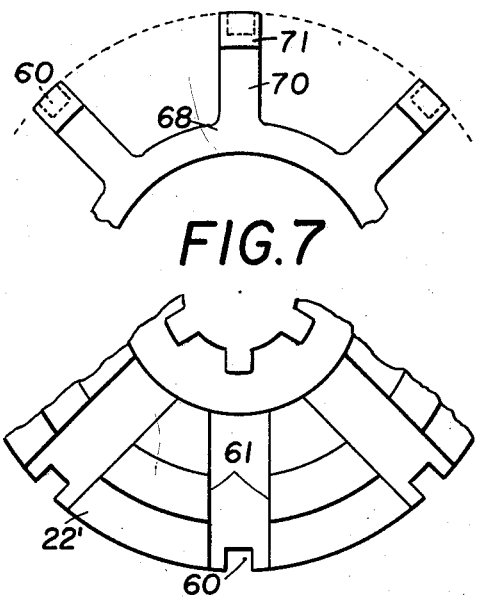
FIG. 7
FIG. 6
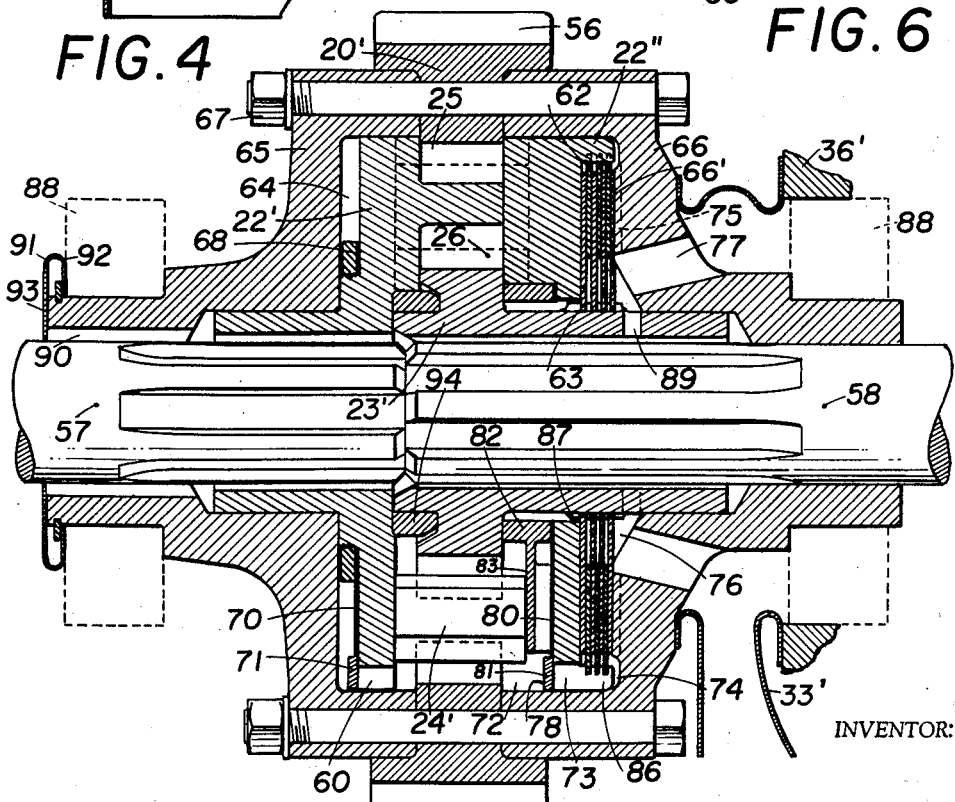
FIG. 5
INVENTOR:
Ernest Wildhaber

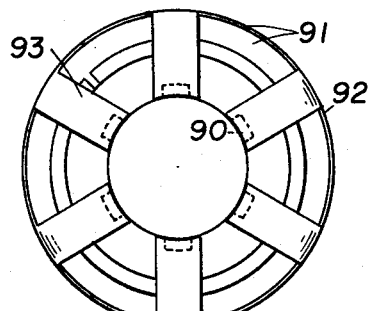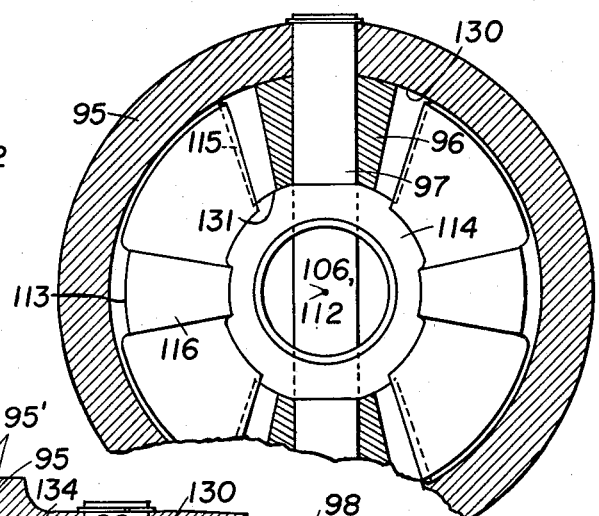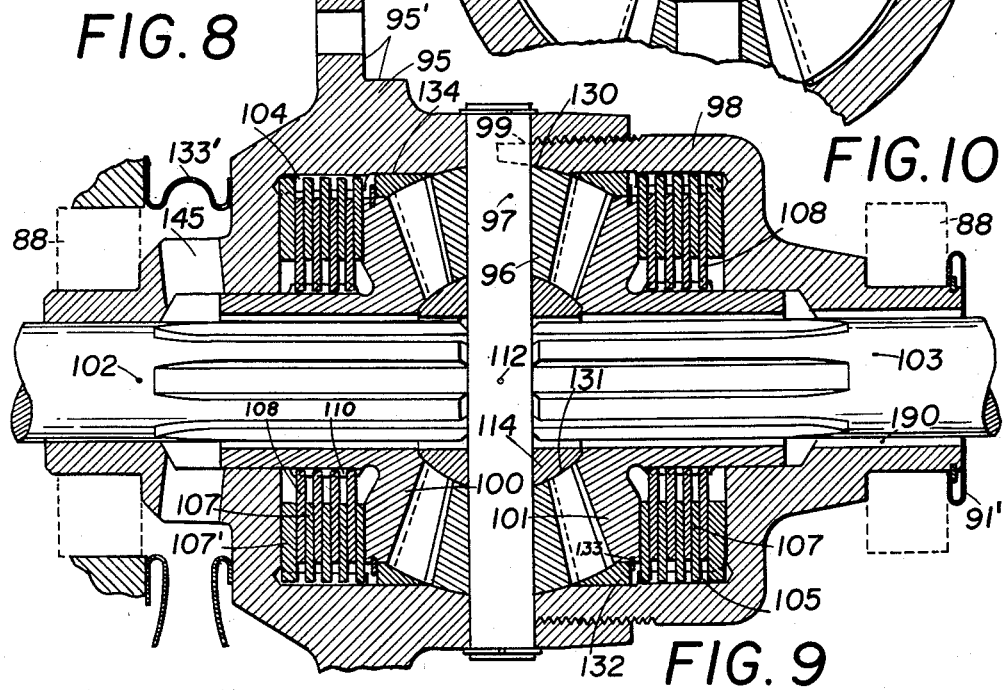

_United States Patent Office_

2,930,256
Patented Mar. 29, 1960

2,930,256

DIFFERENTIAL

Ernest Wildhaber, Brighton, N.Y.

Application May 31, 1957, Serial No. 662,662

6 Claims. (Cl. 74—711)

The present invention relates to differentials for automotive vehicles, adapted to transmit torque between a driving member and two driven members coaxial therewith. The driven members may be for instance the shafts connected with the two wheels of an axle. Particularly it relates to such differentials where relative motion of the two driven members is subjected to a braking or locking effect, and where at least part of this braking effect is obtained through fluid pressure.

One known type of differential with internal braking effect uses reciprocatory parts movable in one of said three coaxial members. These parts engage the two other coaxial members in a torque-transmitting relationship. It has been found that when the transmitted loads are high, such and other differentials of the locking or partial locking type tend to operate somewhat unevenly. The internal braking effect depends on the coefficient of friction. This coefficient is generally larger for rest than for motion, and decreases with increasing relative velocity of the contacting parts. Thus, once the relative motion starts, the said coefficient decreases, and the motion goes on too far. When the motion comes to a stand-still the coefficient rises again. And some time elapses before the torque building up overcomes the static friction and starts relative motion again. In other words, the operation is not strictly continuous with large loads, but starts and stops repeatedly.

A major cause of this uneven motion is the change in the coefficient of friction, which decreases with increasing relative velocity.

One object of the present invention is to counteract this change with a change whereby friction increases with increasing relative velocity of the cooperating parts, so that the overall friction changes less at varying speeds, and a smoother operation is attained. A related object is to employ fluid braking to this end. In differential operation, the moving parts of the differential are made to displace fluid. Free circulation of fluid is obstructed, so that fluid pressure is built up increasingly with increasing relative velocity, and a dash-pot effect or shock absorber effect is attained. Also such fluid action adds to the internal braking or locking effect. The fluid is preferably the axle lubricant.

Further objects are to keep the differential completely filled with such lubricant fluid, or at least filled well above the level of the lubricant in the axle housing, and to effect a circulation of lubricant through the differential already filled with lubricant.

A further aim is to boost the effect of fluid pressure by adding interengaging disks secured to the two driven members of the differential respectively and kept under a load increasing with increasing fluid pressure. A still other object is to help the fluid action along with simple valve parts.

A further aim is to combine two kinds of internal braking or locking effects, one kind being caused by sliding contact of parts loaded increasingly with increasing transmitted torque, and the other kind being caused by fluid pressure and increasing with increasing relative velocity.

Other objects will appear in the course of the specification and in the recital of the appended claims. These objects may be attained singly or in any combination.

In the drawings:

Fig. 1 is a composite axial section of a differential embodying the present invention, taken along lines 1—1 of Fig. 2.

Fig. 2 is a fragmentary end view of the opened differential, looking along its axis from the right of Fig. 1. End part 30 is removed, and the axle shaft is shown in section.

Fig. 3 is a fragmentary cylindrical section coaxial with the differential and laid through the in-take openings (45), the cylindrical section being developed into a plane.

Fig. 4 is a section taken along lines 4—4 of Fig. 1, looking in the direction of the arrows.

Fig. 5 is a composite axial section of a differential embodying a modified form of the invention, and having the same reciprocatory parts and cam members as shown in Fig. 2. The section is taken along lines corresponding to lines 1—1 of Fig. 2.

Fig. 6 is a fragmentary end view of the cage member of this differential, looking from right to left in Fig. 5.

Fig. 7 is a fragmentary end view of valve means used inside of the differential illustrated in Fig. 5.

Fig. 8 is an end view of the valve unit provided at the extreme left end on the outside of the differential shown in Fig. 5.

Fig. 9 is an axial section of another form of differential embodying the present invention.

Fig. 10 is a cross-section laid through the center of this differential, and a view of the member that opposes free circulation of fluid, to build up pressure.

Fig. 11 is a diagrammatic and fragmentary development of the gear peripheries with the intermeshing pinions, illustrating the fluid action in this embodiment.

Figures 1 and 2 show a differential of the general type disclosed in my Patent No. 2,790,334, dated April 30, 1957. It comprises a driving member 20 rigid with a drive gear 21, and two driven members 22, 23 coaxial therewith. These may be connected for instance with the two driven road wheels of an axle respectively, through shafts $22_s$, $23_s$ having splined ends. Member 22 is a cage member in which a plurality of sliding parts 24 are radially movable (Fig. 2). Parts 24 engage cam lobes 25 provided internally on member 20 and cam lobes 26 provided externally on member 23, in a torque-transmitting relationship. The cam lobes 25 especially have a tooth-like appearance, so that the driving member 20 can be considered an internal toothed member. Reference is made to the aforesaid patent for a complete description of the action of this type of differential. As the parts transmit torque with sliding engagement, on relative motion of the two driven members 22, 23, friction results that opposes such relative motion. This friction increases the tractive effort of the slower moving road wheel, and enables the wheel with more grip to transmit more torque.

The friction thus developed depends on the coefficient of friction, which is not constant. It changes with the relative speed, and is generally larger at zero speed than in motion. Thus there is more friction before and at the start of relative motion than after the start. This change from static friction to sliding friction tends to impair the smoothness of operation at large load.

According to the invention another kind of friction is added, which increases with increasing speed and is zero at zero relative speed. It is attained with fluid displacement. Because of the opposite variation of this additional friction, the total friction varies less with the relative speed, and is more nearly constant. It thus improves the smoothness of operation.

Displacement of the sliding parts 24 changes the volume of the engaged spaces between cam lobes and in the ways of said parts. Thus for instance outward displacement of the diametrically opposite parts $24_a$ decreases the volume in the spaces 27. And if these spaces and the whole differential are filled with fluid, the fluid is pressed out from these spaces. To achieve fluid pressure in these spaces, and frictional resistance, means are provided that obstruct free displacement of fluid. These means are constituted by the adjacent surfaces which fit and close up the ends and sides of these spaces. Thus plane surface 28 of side-part 30 and cylindrical surface 31 of side-part 32 are among these adjacent surfaces. Fluid is pressed from the contracting or diminishing spaces to the expanding spaces. For best operation the differential should be completely filled with fluid, or nearly so.

Preferably the lubricant supply in the axle housing furnishes this braking fluid. This supply also serves the drive gear 21.

Part of the invention resides in structure to keep the differential filled with lubricant from the lubricant supply of the drive gear, or at any rate to keep it filled well above the lubricant level outside of the differential.

To this end I provide an intake conduit 33 whose intake opening 34 reaches well below the normal lubricant level 35. It is rigidly secured to the stationary seat 36 of bearing 37 and slidingly fits the plane side 38 of side-part 32. Bearing 37 and opposite bearing 40 support the outer member of the differential, composed of the driving member 20 with drive gear 21 and of the two side-parts 30 and 32 rigidly and tightly secured together with screws 41. Leakage of fluid from the conduit 33 through bearing 37 is prevented or retarded by a cage 42 that nearly fits both the inner race 43 and the outer race 44 of the bearing, or in any other suitable known way.

The openings 45 provided in side-part 32 are inclined to the periphery, and constitute a helical pump. This pump tends to displace fluid from the conduit 33 to the inside of the differential on forward motion in the direction of arrow 46 (Fig. 3). Its effect increases with increasing car speed. There is not much reverse motion. And what little there it, is at low speed. Its practical effect on fluid displacement is negligible.

In ordinary operation the fluid moves from the conduit 33 to space 47; and from there through holes 48 provided in the cage member 22 to the central space 50. Centrifugal inertia tends to move the fluid out to the working parts. The surplus fluid can escape along the bottoms 51 of the deepened internal splines 52 provided in member 23, and along the bore 53 of side-part 30. This bore fits the shaft $23_s$ only loosely. In this way circulation of fluid is attained. The fluid enters the differential at the left (Fig. 1) and leaves at the right.

With the described arrangement the differential can stay filled with fluid even at stand-still, provided that the difference between the diameter of bore 53 and the diameter of shaft $23_s$ is small enough that no air can enter through the narrow opening filled with the usual lubricant of high viscosity.

Conduit 33 is further shown in Fig. 4. It contains holes 54 for securing it with screws to seat 36 of bearing 37. It is of resilient and yielding construction, so that no undue pressure is exerted between it and side-part 32, regardless of displacements under heavy load. It may be made of thin-walled metal, to yield under moderate load. Or it may be made of non-metal, if desired.

*Further embodiment*

The embodiment now to be described with Figures 5 to 8 is of the same general type as the one already described, in that it uses a toothed internal driving member 20' rigid with, and here formed integral with a drive gear 56. The two driven members of the differential are a cage member 22' with sliding parts 24' and an external cam member 23', connected respectively to shafts 57, 58 with splined ends.

The teeth of the internal driving member 20' are cam lobes 25' identical with the cam lobes 25 shown in Fig. 2. The sliding parts 24' have the same profiles as the parts 24 of Fig. 2. And the cam lobes 26 of member 23' are identical with those of Fig. 2. Indeed Fig. 2 also corresponds to Fig. 5, except that the cage member 22', shown also in Fig. 6, further contains a notch 60 at the outer end of each way 61. The action of the sliding parts is the same as in the described embodiment. Here however the fluid-braking action is amplified with interengaging friction disks 62, 63 secured respectively to the two driven members 22', 23'.

Side-part 65 and opposite side-part 66 are rigidly secured to the driving member 20' by screws 67, and constitute the outer member of the differential. It is rotatably mounted in bearings 88.

Each notch 60 of the cage member 22' connects a space 64 formed on one side of the cage member with a guideway 61 and adjacent portions between the cam lobes. Each notch 60 is individually controlled by valve means, which let fluid out to space 64 but not into the notch from said space. Thus space 64 is kept under pressure on differentiation. These pressure valves have a common, ring-shaped disk portion 68 (Fig. 7) and thin individual arms 70 acting like mild leaf springs. At their ends 71, opposite the notches 60, the arms have increased thickness to withstand pressure in space 64 (see Fig. 5). Each valve opens up when the pressure in its notch exceeds slightly the pressure in space 64. And it keeps closed when the pressure in space 64 exceeds the pressure in the notch and in the guide-way portion connected therewith.

The various valves (71) operate at different times, depending on which guideways 61 are under pressure on the outside, so that space 64 is continuously under pressure on relative motion of the differential. This pressure tends to displace the cage member 22' axially towards side-part 66. Adjacent side-part 65 an extension part 22'' is provided, that moves with the cage member 22'. If desired, it may be rigidly secured thereto. Or it may be attached thereto by engagement of its ways 72 with the sides of the sliding parts 24'. The ways 72 have the same width as the ways 61 and are also radially arranged. They can be considered continuations of the ways 61.

Extension part 22'' contains notches 73 similar to the notches 60, and of the same number. They connect the ways 72 individually with narrow space 74, and through grooves 75 provided on the face 66' of side-part 66 with the space 76 adjacent the intake openings 77. These are formed similar to the described openings 45, to draw fluid in during forward motion. A plurality of individual valves 78 are disposed to let fluid in to the ways 72, but not not to let it out. These suction valves are similar in construction to the described pressure valves 71. They have a common ring-shaped disk portion, from which thin individual arms 80 reach out radially to support their ends 81, the valves proper. The ring-shaped disk portion is clamped between an insert 82 and extension part 22''. Insert 82 has projections 83 reaching into the ways 72 to support the ends of the sliding parts 24'. The outer portions of projections 83 have a U-shaped cross-section for support on part 22'', the sides of the U-shape contacting the bottom of the respective ways 72 on opposite sides of the valve arms 80.

The valves 78 admit fluid rapidly to the suction sides, where needed, and keep fluid pressure away from face 66'. A plurality of interengaging disks 62, 63 are rotatably secured respectively to projections 86 of extension part 22'' and to splines 87 provided on the hub of member 23'. The two sets of disks are thus constrained to turn with the two driven members 22' and 23' respectively. The disks may be of any suitable known surface structure and material, preferably metal; and one set of disks may be of different material than the other, if desired.

The fluid pressure in space 64 is transmitted to the face 66' of side-part 66 through the disks 62, 63 to create friction increasing with increasing pressure and with increasing relative speed of the members of the differential. The frictional torque is transmitted directly from one driven member to the other. This is as effective for torque unbalance of the two driven members as if the same torque were transmitted through an equal number of disks from one driven member to the driver and from the driver to the other driven member through another equal number of disks. This would require twice as many disks for the same effect. Thus the described arrangement is highly effective.

The outer member of the differential, composed of member 20' and side-parts 65, 66, is rotatably journalled in bearings 88 indicated diagrammatically. The intake conduit 33' is secured to the seat 36' of a bearing 88 and engages the plane outer end of side-part 66 with a light pressure. At forward motion the fluid enters through the openings 77 on one side of the differential, and leaves on the opposite side, passing from space 76 through holes 89 in the hub of member 23' to the deepened bottoms of the splines provided internally in said hub, through the deepened bottoms provided internally in the hub of the cage member 22' (see Fig. 6), and through spline-like passages 90 provided on the inside of side-part 65. These passages are shown in dotted lines in Fig. 8. A valve unit 91 closes these passages to intake, but permits outlet. It is shown in an end view in Fig. 8. It comprises a circular body portion or ring 92, from which wide and thin arms 93 extend inwardly to close the passages 90 to intake, especially air intake at standstill.

The hub of cage member 22' is rotatably mounted in side-part 65. And the hub of cam member 23' is rotatably mounted in side-part 66. It is further mounted in a ring 94 secured to cage member 22' at the inner end of its ways 61. Other features are obvious from the drawings.

Bevel gear differential

An application to a bevel gear differential will now be described with Figures 9 to 11.

The driving member 95 of the differential is a planet carrier, having a seat 95' for securing a drive gear thereto. Member 95 carries a pair of tapered pinions 96 rotatably mounted on a pin 97 secured to member 95. A side-part 98 is rigidly secured to member 95 to form a unit therewith, which is rotatably mounted in spaced bearings 88. Part 98 threads into member 95, and has a cylindrical pilot portion 99 at its front end. Preferably the hole or bore in which the pin 97 rests is finished after the part 98 has been threaded to full depth into member 95. After assembly, the pin 97 also secures the part 98 against turning.

If desired, part 98 may be enlarged to contain the internal thread, while member 95 then contains the mating external thread.

The tapered planetary pinions 96 mesh with side gears 100, 101 mounted in member 95 and part 98 respectively, and splined to shafts 102, 103 respectively. Other splines 104, 105 are formed in member 95 and part 98 by drilling holes parallel to the axis 106 of the differential, and then exposing said drill holes by removing the stock adjacent the inner side of said holes up to near their axes. However conventional splines may also be used instead. Disks 107 are secured to the splines thus formed, to rotate with member 95 and part 98. Other disks 108 alternate with the disks 107 and are connected to the hubs of the side gears 100, 101 by splines 110 formed at the outside of their hub portions. The interengaging sets of disks are disposed on opposite sides of the planetary pinions. They are disposed to transmit the axial pressure of the side gears 100, 101 to the outer member 95 and side-part 98. Part of this pressure is the axial component of the tooth loads exerted on the side gears by the planetary pinions 96.

The end disks 107' are preferably formed as springs having each a pair of waves that flatten out under pressure. The waves are disposed to exert more pressure midway between the planet pinions, at moderate loads. This tends to equalize the pressure around the periphery at ample loads. Also it provides a preload.

Under pressure the side gears move back very slightly in axial direction. Wear of the disks further increases this axial displacement. For this reason I preferably provide a tooth shape on the side gears such that the tooth bearing with the pinions is undisturbed by such axial displacement. The tooth sides of the side gears 100, 101 are made helical surfaces, as described in my pending application "Toothed Member," Serial No. 624,343, filed November 26, 1956.

The teeth of each pinion 96 preferably extend along a mean conical surface having less taper and being more nearly cylindrical than the conical pitch surface. The latter has its apex at the intersection 112 of the axes of the gears and pinions.

Part of the load exerted upon the disks 107, 108 is caused by fluid pressure, that increases with increasing relative velocity of the two driven members 100, 101. Fluid pressure is built up by a part 113 obstructing free passage of fluid. This part is formed integral with a central hub portion 114. It has internal conical surface portions 115 engaging the outside surface of each pinion 96, and other slightly internal conical portions 116 engaging the conical outside surface of each side gear. Its structure is best seen in Fig. 11.

When the pinions turn for instance in clockwise direction, the regions 120, 120' at side gear 100 are under pressure, while the regions 121, 121' are suction spots. Likewise the regions 122, 122' at side gear 101 are under pressure, and regions 123, 123' are suction spots. The part 113 is shaped to provide large regions. Its sealing surface portions 115, 116 occupy only a little more than one pitch of the teeth, and less than two pitches. The pressure in regions 120, 120' tends to move gear 100 axially away from the pinions. Similarly the pressure in regions 122, 122' tends to move the gear 101 axially away from the pinions in opposite direction. Thus the interengaging disks are put under additional load, which increases with increasing relative velocity. The combined load thus increases with increasing transmitted torque and with increasing relative velocity. The friction created changes less with the relative velocity than the friction created by tooth pressure alone and provides smoother operation.

Fluid circulation in the differential, at forward motion, is similar to the one described. Fluid enters through conduit 133', flows through intake openings 145 which are in the form of a pump, along the bottoms of the deepened internal splines of side gear 100 to the center of the differential. It can escape along the bottoms of the deepened internal splines of side gear 101 and through spline-like passages 190 provided on the inside of side-part 98. A valve unit 91' closes these passages to intake, but permits outlet at the slightest pressure. It is of the same type as the valve unit 91 shown in Fig. 8.

The planet pinions 96 have spherical end surfaces 130, 131, and the adjacent portions of the side gears have continuations of these spherical surfaces, centered at 112. The convex pinion surface 130 bears on a counterpart concave spherical surface provided on member 95 and side-part 98. If the side gears 100, 101 were to bear on a continuation of this surface, the large axial thrust would be taken up at this surface, and the axial gear displacement would be impaired. To avoid this, a pair of rings 132 are provided, which are axially fixed to the gears 100, 101 respectively by snap rings 133. The rings 132 have spherical inside surfaces matching surface 130 and its continuation, so that leakage is avoided or confined. They have cylindrical outside surfaces 134 which permit them to slide axially in the planet carrier.

While pumps acting inwardly, as the pump constituted by openings 145, are unusual, they are still sufficiently effective for the present purpose of achieving some circulation.

I generally prefer non-positive pumps whose rotors are part of the outer member of the differential and contain fluid passages inclined to their circumference, to positive pumps such as gear pumps. The latter require added structure and are apt to consume more power.

In the just described embodiment, as well as in the previous one, friction disks are used to amplify the fluid action. The friction obtained through fluid action is however not the only friction and not the chief friction in the differential. In the last-described embodiment the friction disks are also under a load increasing with increasing torque applied by the driving member, this load being the axial component of the tooth load exerted on a side gear. Through selection of the number of friction disks this component is made large enough to cause the slower moving driven member of an axle to transmit at least twice the torque of the opposite driven member. Thus the frictional torque increases with increasing torque applied by the driving member. To this torque is added the frictional torque caused by fluid pressure. There is ample frictional torque also when relative motion starts.

In the embodiment of Figures 5 to 8 the load on the friction disks is caused by fluid pressure alone. But the main torque is transmitted through the reciprocatory parts with sliding contact. This results in ample friction increasing with increasing torque applied by the driving member. Here as well as in the first-described embodiment this friction by itself is large enough to cause the slower moving driven member to transmit at least twice the torque of the opposite driven member.

The differentials may also be used as interaxle differentials or torque dividers.

While the invention has been described in connection with several different embodiments thereof, it will be understood that it is capable of further modification; and this application is intended to cover any variations, uses, or applications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A differential comprising a rotary driving member rigid with a drive gear and two rotary driven members coaxial therewith, a plurality of parts carried by one of said three coaxial members and movable thereon in predetermined paths, a fluid, said fluid being part of the lubricant supply for said drive gear, said parts engaging the two other named members to transmit the torque of the differential between said members and being operative upon said fluid as they move, whereby said fluid is displaced in operation, means for obstructing free displacement of fluid to build up fluid pressure increasingly with increasing relative angular velocity of said members, means continuously operative upon rotation of said driving member for effecting circulation of said fluid through the differential from an entering region to a leaving region spaced from said entering region, a duct rising from below the normal lubricant level and surrounding the entering region, said duct slidably fitting the adjacent side of the differential to enable it to remain filled with the fluid above said level, and valve means disposed adjacent said leaving region to prevent fluid or air from entering there.

2. A differential according to claim 1, wherein said driving member is rotatably mounted on two anti-friction bearings disposed at opposite sides of the differential, and wherein said duct is conencted with the seat of the outer race of the adjacent anti-friction bearing.

3. A differential according to claim 1, wherein said valve means are in the form of portions connected by radial arms to a ring coaxial with the differential, said radial arms constituting radial leaf springs.

4. A differential comprising a driving member and two driven members coaxial therewith and rotatable relatively to each other, positive means for transmitting torque between said members, two sets of friction disks interengaging each other and secured to turn with two of said members respectively, a fluid supply, means for creating fluid pressure increasingly with increasing relative angular velocity of said two driven members, means for exerting pressure on said disks through said fluid, and a valve unit for controlling fluid flow in said differential, said valve unit comprising a plurality of fluid-control portions connected through resilient radial arms with a comomn ring-shaped portion concentric with the differential.

5. A bevel-gear differential comprising a driving member and two driven side gears coaxial therewith and with one another, said driving member being a planet carrier having planetary bevel pinions rotatably mounted thereon in mesh with said side gears, said pinions exerting axial thrust on said side gears that increases with the tooth load, two sets of friction disks secured to turn with two of said coaxial members respectively and disposed to transmit said axial thrust, a body of fluid, said fluid being displaced at the region of mesh of the pinions with said side gears on rotation of said pinions, means for obstructing free circulation of fluid at said mesh region to build up fluid pressure increasingly with increasing speed of rotation of said pinions, and means for exerting pressure on said disks through said fluid.

6. A differential according to claim 5, wherein a spherical surface is provided at the outer ends of said pinions and on the adjacent portions of said side gears, said surface being centered on the axis of said coaxial members at the intersection with the axis of a pinion, and wherein each of said side gears carries a ring fitting said spherical surface of the respective gear and having a cylindrical outside surface, said outside surface being axially slidable in said planet carrier, and wherein means are provided for maintaining each said ring in a fixed axial position on the respective side gear.

References Cited in the file of this patent

UNITED STATES PATENTS

| | | |
|---|---|---|
| 1,481,889 | Carhart | Jan. 29, 1924 |
| 2,263,936 | Taylor | Nov. 21, 1941 |
| 2,569,563 | Grantham | Oct. 2, 1951 |
| 2,722,140 | Cabell | Nov. 1, 1955 |
| 2,790,334 | Wildhaber | Apr. 30, 1957 |

FOREIGN PATENTS

| | | |
|---|---|---|
| 679,643 | Germany | Aug. 12, 1939 |
| 1,083,711 | France | June 30, 1954 |